(12) United States Patent
Ding

(10) Patent No.: US 8,587,808 B2
(45) Date of Patent: Nov. 19, 2013

(54) METHODS AND APPARATUS TO PROVIDE AVAILABILITY FOR NETWORKED SCANNING

(75) Inventor: Yi Ding, Saratoga, CA (US)

(73) Assignee: Ricoh Company, Ltd, Tokyo (JP)

( * ) Notice: Subject to any disclaimer, the term of this patent is extended or adjusted under 35 U.S.C. 154(b) by 553 days.

(21) Appl. No.: 12/641,207

(22) Filed: Dec. 17, 2009

(65) Prior Publication Data
US 2011/0149352 A1    Jun. 23, 2011

(51) Int. Cl.
*H04N 1/00* (2006.01)
*H04N 1/32* (2006.01)
*G06K 15/00* (2006.01)

(52) U.S. Cl.
USPC .......... 358/1.15; 358/403; 358/407; 358/468; 358/487; 358/1.14

(58) Field of Classification Search
None
See application file for complete search history.

(56) References Cited

U.S. PATENT DOCUMENTS

| | | | |
|---|---|---|---|
| 2005/0141041 A1* | 6/2005 | Jung | 358/401 |
| 2006/0087679 A1* | 4/2006 | Sugimoto | 358/1.15 |
| 2006/0109507 A1* | 5/2006 | Murata | 358/1.15 |
| 2006/0212590 A1* | 9/2006 | Parks et al. | 709/229 |
| 2006/0262359 A1* | 11/2006 | Lee | 358/474 |
| 2007/0074291 A1* | 3/2007 | Lee | 726/24 |
| 2009/0225349 A1* | 9/2009 | Hirai | 358/1.15 |

* cited by examiner

*Primary Examiner* — Benny Q Tieu
*Assistant Examiner* — Haris Sabah
(74) *Attorney, Agent, or Firm* — Duft Bornsen & Fettig LLP

(57) ABSTRACT

Methods and apparatus for scanning documents when a network is not available are provided. The document scans at least an entire page of a document for a user. If the document scanner identifies that the network is not available, the document scanner stores the scanned document in a repository at the document scanner. The document scanner also identifies when the network is available again. In response, the document scanner retrieves the stored scan document and sends the retrieved scan document to a destination computer over the network.

15 Claims, 6 Drawing Sheets

METHODS AND APPARATUS TO PROVIDE AVAILABILITY FOR NETWORKED SCANNING

BACKGROUND

1. Field of the Invention

The invention relates to networked document scanners, and more specifically relates to providing availability for a document scanner on a network when the network is not available.

2. Discussion of Related Art

Rather than creating offices that are purely paperless, companies have been creating tools that allow paper-based documents to better integrate with electronic documents. One such tool is a document scanner, which scans a paper-based document with a number of pages into an electronic document with a number of images. The document scanner may be networked, so that the document scanner can send a scanned document to a destination computer. The "destination computer" stores the scanned document at least temporarily, and may comprise a server, a personal computer, a computing device, and/or a scan server that performs post-scan processing, etc. The scan server may forward a scanned document to another server, computer, or device.

A user may log into the document scanner by providing login information. The "login information" may comprise any information for the user to log into the document scanner and/or to access the document scanner. The login information may be provided by user input including keypad entry, card/badge reader, biometrics, etc. Based on the login information, the document scanner may contact a directory server to authenticate that the user is authorized to use the document scanner and/or the scan server. The document scanner may also identify a number of scan environments from the directory server that the user is authorized to use. A "scan environment" may include information about scan settings (such as scan resolution for physically scanning a document), the destination computer, and/or filter for processing a scanned image, etc. The user selects one of the scan environments and proceeds to scan the document by pushing a scan button (or other common user interface). The document scanner may identify the scan server from the selected scan environment, and send the scanned document to the scan server along with the selected scan environment. The scan server may then perform additional processing, and forward the processed document to a file server, a computer or computing device, and/or an e-mail box based on the selected scan environment.

However, the network may not be available for some reason. The network is not "available" if the document scanner cannot communicate with a directory server and/or a destination computer. For example, the network is considered not available even if the subnetwork on which the document scanner resides is working, but the subnetwork on which the scan server resides is disconnected or not working. This unavailability is often a temporary condition. The document scanner thus may not be able to authenticate the user and/or identify scan environments from the directory server while the network is not available. The document scanner also may not be able to send the scanned document to the Destination computer. In these scenarios, present techniques used in scanners typically delete the scanned document. If the scanned document is not deleted, the document scanner typically cannot proceed with scanning a next document, making the document scanner unavailable for use. Meanwhile, the user or other users may have additional documents that need to be scanned. The present techniques impose a burden on users to retry scanning documents later when the network is available again.

There is thus a need to provide availability for the document scanner when the network is not available.

SUMMARY

The present invention solves the above and other problems, thereby advancing the state of the useful arts, by providing methods and apparatus for scanning documents when a network is not available. The document scans at least an entire page of a document for a user. If the document scanner identifies that the network is not available, the document scanner stores the scanned document in a repository at the document scanner. The document scanner also identifies when the network is available again. In response, the document scanner retrieves the stored scan document and sends the retrieved scan document to a destination computer over the network.

In one embodiment, a method provides availability for a document scanner on a network. The method includes scanning at least an entire page of a document for a user to generate a scanned document using a scanner. The method also includes identifying at the document scanner that the network is not available, and storing the scanned document at the document scanner in response to the network not being available. Additionally, the method includes identifying at the document scanner that the network is available. The method further includes retrieving the stored scanned document, and sending the retrieved scanned document from the document scanner to a destination computer over the network in response to identifying that the network is available.

In another embodiment, a method provides availability for a document scanner on a network. The document scanner comprises a DSM device. The method includes scanning at least an entire page of a document for a user to generate a scanned document using a scanner. Additionally, the method includes identifying at the document scanner that the network is not available, and storing the scanned document at the document scanner in response to the network not being available. Moreover, the method includes identifying at the document scanner that the network is available. The method further includes retrieving the stored scanned document, and sending the retrieved scanned document from the document scanner to a Distributed Scan Management ("DSM") server over the network in response to identifying that the network is available.

In yet another embodiment, a document scanner is provided for scanning documents over a network. The document scanner includes a scanner operable to scan at least an entire page of a document for a user to generate a scanned document. The document scanner also includes a control module operable to identify whether the network is available. The document scanner further includes a repository module operable to store the scanned document at the document scanner in response to the network not being available. Additionally, the document scanner includes an availability module operable to retrieve the stored scanned document. The control module is further operable to send the retrieved scanned document from the document scanner to a destination computer over the network in response to the control module identifying that the network is available.

BRIEF DESCRIPTION OF THE DRAWINGS

The same reference number represents the same element or same type of element on all drawings.

DETAILED DESCRIPTION OF THE DRAWINGS

FIGS. 1 through 6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
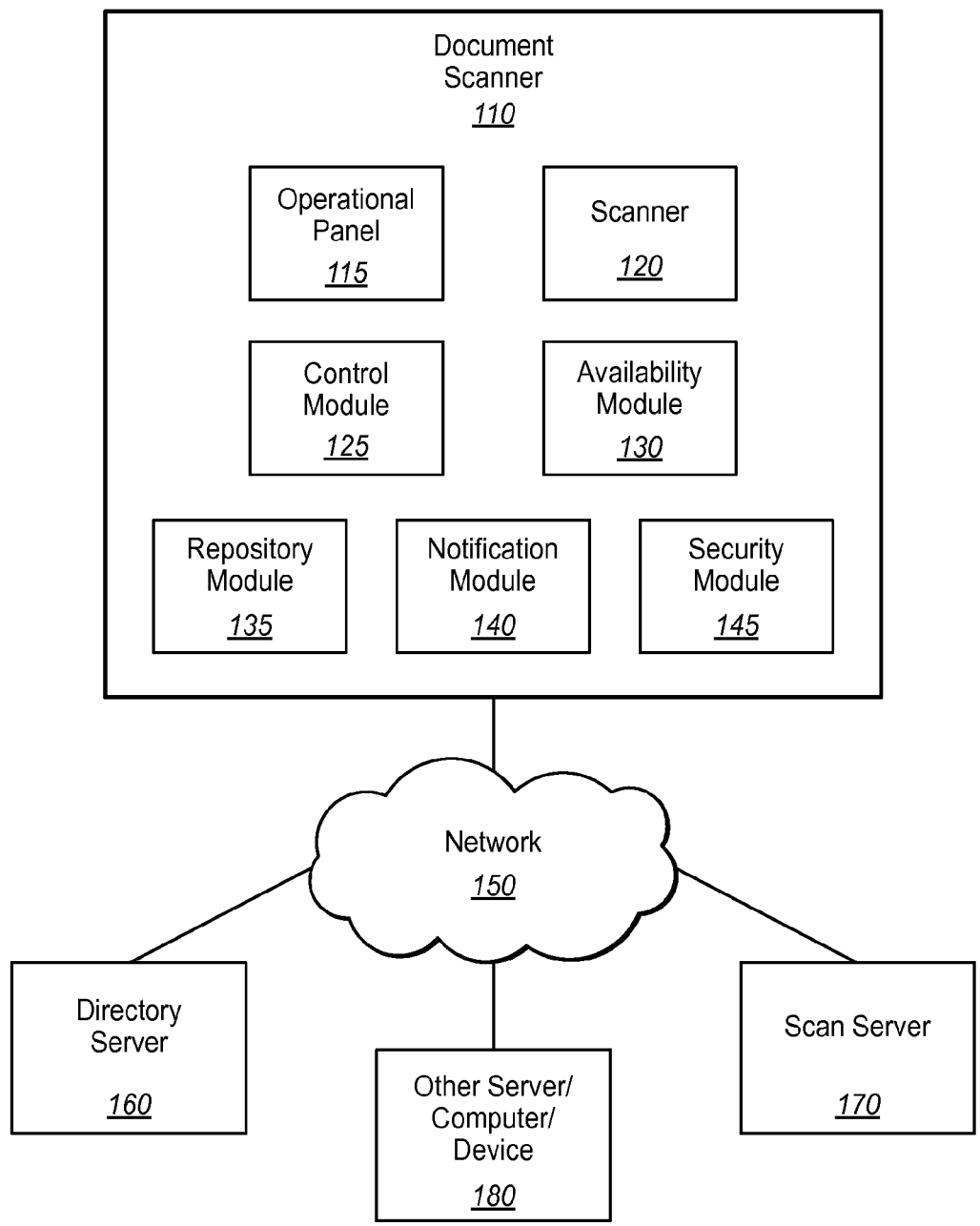
FIG. 1 is a block diagram of an exemplary system for providing availability for a document scanner in an embodiment.

FIG. 1 is a block diagram of an exemplary system for providing availability for a document scanner 110 in an embodiment. The document scanner 110 may comprise any scanner operable to scan a document that has a number of pages into an electronic document. For example, the document scanner 110 may comprise a standalone scanner or part of an MFP. The word "MFP" may be read as multi-function peripheral, multi-function printer, or multi-function product.

The document scanner 110 also has networking capabilities for communicating on a network 150. For example, the network 150 may comprise a TCP/IP network, and the document scanner 110 may communicate using TCP/IP and/or any suitable protocols. The document scanner 110 is in communication over the network 150 with a destination computer. It is noted that the "destination computer" stores a scanned document at least temporarily. The "destination computer" may comprise a scan server 170 and/or other server, computer, or device 180. The document scanner 110 may also be in communication with a directory server 160. The scan server 170 and the other server, computer, or device 180 may each comprise any computer destination capable of receiving a scanned document. The directory server 160 may comprise any server capable of providing directory services and/or authenticating a user. It is noted that the directory server 160 and the scan server 170 are seen conceptually as separate servers providing separate services, but they may in fact be the same physical server or numerous physical servers.

In order for a user to access the document scanner 110, the user may need to enter login information first. The "login information" may comprise any information for the user to log into the document scanner and/or to access the document scanner. For example, the login information may comprise the user's username and password in one embodiment. In another embodiment, the login information may further comprise a Windows domain name (for example, in an enterprise environment based on Microsoft Windows). In this embodiment the document scanner is part of the Windows domain, and a user logs into the document scanner by logging into the Windows domain just as the user would log into a computer of the Windows domain. In yet another embodiment, the login information may comprise the user's X.509 certificate.

In one embodiment, the document scanner 110 may comprise a Distributed Scan Management ("DSM") device, the scan server 170 may comprise a DSM scan server, and the directory server 160 may comprise an Active Directory server (i.e., a domain controller). The document scanner 110 may send the user's login information (for example, the user's username, password, and Windows domain name) to the directory server 160 to authenticate that the user is authorized to use the document scanner 110 and/or the scan server 170. As a DSM device, the document scanner 110 may use the Distributed Scan Processing Web Service ("WS-DSP") web service/protocol to communicate with the scan server 170, with the scan server 170 being the "destination computer" under the DSM architecture. For example, after scanning a document, the document scanner 110 may use the WS-DSP protocol to create a post-scan processing job on the scan server 170. The post-scan processing job includes a scan environment. A "scan environment" may include information about one or more of the following: scan settings such as scan resolution for physically scanning a document, the destination computer, filter for processing a scanned image, etc. The scan environment may be termed "scan process" or "post-scan process" ("PSP") under DSM terminology. The document scanner 110 also sends the scanned document to the scan server 170. Subsequently, the scan server 170 may perform post-scan processing, and forward the scanned document to the other server, computer, or device 180.

The document scanner 110 may include an operational panel 115, a scanner 120 and a control module 125. The operational panel 115 may comprise any device operable to display information for a user and/or to receive input from the user. For example, the operational panel 115 may comprise an LCD display, a keypad, and/or a touchscreen. The scanner 120 may comprise any software, circuitry, computer, and/or device capable of optically sensing images and/or text on a page of a document. The scanner 120 may also include a document feeder to handle a number of pages of the document automatically. The control module 125 may comprise any software, circuitry, computer, and/or device capable of controlling various functions of the document scanner 110. For example, the control module 125 may identify whether the network 150 is available to the document scanner 110. The control module 125 may also identify login information entered by the user for logging into the document scanner 110, and/or identify a scan environment selected by the user from a list of scan environments.

Additionally, the document scanner 110 may also include an availability module 130, a repository module 135, a notification module 140, and a security module 145. The availability module 130 may comprise any software, circuitry, computer, and/or device capable of forwarding the scanned document to the repository module 135 when the network 150 is not available, and retrieving the stored scanned document from the repository module 135 when the network 150 becomes available again.

The repository module 135 may comprise any software, circuitry, computer, and/or device capable of storing the scanned document and certain associated information. The repository module 135 may also be capable of storing login information and/or scan environments so that the user is still able to log into the document scanner 110 (for example, by matching login information entered by the user with stored login information) and/or selecting a scan environment when the network is not available. Additionally, the repository module 135 may be capable of allowing a previously stored scanned document and certain associated information to be retrieved and/or removed. Moreover, the repository module 135 may be capable of cleaning up scanned documents and certain associated information that have become out of date after having been stored for a period of time without being used. For example, the period of time may be three months, and the period of time may be configured by an administrator.

The notification module 140 may comprise any software, circuitry, computer, and/or device capable of initiating a notification to the user at the document scanner 110 or over the network 150. For example, the notification module 140 may create a message on the operational panel 115 of the document scanner 110. Alternatively or in addition, the notification module 140 may use well known techniques to initiate a notification over the network 150 to the user by using e-mail, text messaging, voice messaging, etc. The particular type of notification for each user may be configured by an administrator and/or may be selected by each user.

The security module 145 may comprise any software, circuitry, computer, and/or device capable of authenticating that the user is authorized to use the scan server 170. For example, the security module 145 may contact the directory server 160, if the network 150 is available, to authenticate the user. Additionally, even if the user has already been authenticated (by the document scanner contacting a directory server or by matching stored login information that has been cached at the document scanner) when the user logs into the document scanner, the security module 145 may still authenticate the user again after the network 150 becomes available. For example, information on the directory server 160 may have changed while the network 150 is not available such that the user may no longer be authorized to use the scan server 170.

One skilled in the art will recognize that FIG. 1 is illustrative in nature, and that specific blocks or modules depicted in FIG. 1 may be grouped in fewer or more exemplary modules as a matter of design choice. Additionally, one skilled in the art will recognize that any specific blocks may comprise any number of circuits, processors, memory systems (both persistent and volatile), programmable devices, hard disks, flash based persistent storage, battery backed up random access memory (RAM), or any other system or apparatus operable to perform the functionality recited herein with respect to FIG. 1.

Figure 2:
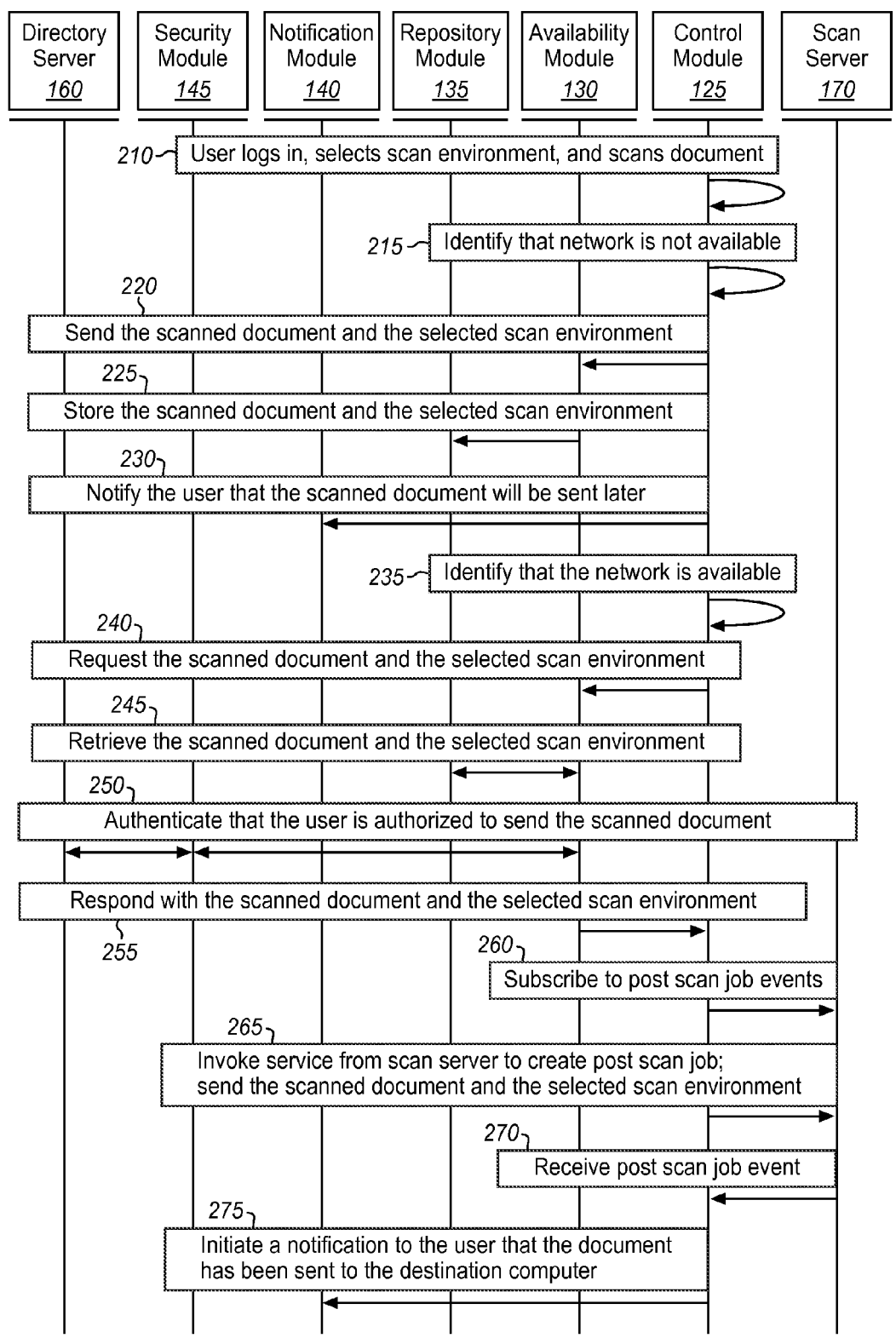
FIG. 2 is an exemplary message flow diagram for providing availability for a document scanner in an embodiment.

FIG. 2 is a message flow diagram for providing availability for the document scanner 110 in an embodiment. Components as exemplified in FIG. 1 that initiate and receive messages are depicted at the top of the diagram. An arrow pointing from entity A to entity B generally denotes a message being sent from entity A to entity B. At flow 210, the control module 125 accepts login information from a user to logs into a Windows domain by entering the user's username and password, as well as a Windows domain name on the operational panel 115. The control module 125 also accepts an input from the user to select a destination computer (for example, the other server, computer, or device 180) for sending a scanned document. The control module 125 may further accept any additional input from the user for selecting a scan environment (that may include scan settings such as a scan resolution) that is available on the document scanner 110. When the user presses a scan button, the control module 125, in conjunction with the scanner 120, scans a document based on the selected scan environment.

It is noted that by logging into the Windows domain, the user is also logged into the document scanner 110 that is part of the Windows domain. If the document scanner 110 is not able to contact the directory server 160 (i.e., the domain controller in this embodiment), the document scanner 110 can still log the user into the Windows domain using cached account information. However, if the directory server 160 is not available to validate the login information, the user cannot access network resources that require domain validation.

At flow 215, the control module 125 identifies that the network 150 is not available, so that the control module 125 cannot send the scanned document to the destination computer (for example, the scan server 170 and/or the other server, computer, or device 180). Instead, the control module 125 sends the login information of the user, the scanned document, and the selected scan environment (that may include the scan settings, destination computer, and filter for processing scanned image) to the availability module 130 at flow 220. In turn, the availability module 130 at flow 225 sends the login information, the scanned document, and the selected scan environment to the repository module 135 for the repository module to store the login information, the scanned document, and the selected scan environment.

At flow 230, the control module 125 requests the notification module 140 to notify the user that the scanned document will be sent later when the network becomes available. For example, the notification module 140 may create a message on the operational panel 115 of the document scanner 110 to display the notification. Flows 210 through 230 may repeat so that the document scanner 110 is still available to scan additional documents while the network 150 is not available.

At flow 235, the control module 125 identifies that the network 150 is available. In response, the control module 125 at flow 240 requests the login information, the scanned document, and the selected scan environment from the availability module 130. In turn, the availability module 130 at flow 245 requests the repository module 135 to retrieve the login information, the scanned document, and the selected scan environment.

Additionally, the availability module 130 also authenticates, through the security module 145 at flow 250, that the user is authorized to send the scanned document. The security module 145 may contact the directory server 160 based on the login information to authenticate that the user is still authorized to send the scanned document to the scan server 170. At flow 255, the availability module 130 then responds to the control module 125 with the login information, the scanned document, and the selected scan environment. At flow 260, the control module subscribes to post-scan job events from the scan server 170. For example, under the DSM architecture, the document scanner as a DSM device may send the scanned document to the scan server 170 for post-scan processing, and receive processing status back asynchronously in an event notification.

At flow 265, the control module 125 invokes services available from the scan server 170 to create a post-scan job. For example, the control module 125 may invoke the CreatePostScanJob operation (as specified in DSM) for the scan server 170 to create the post-scan job that includes the selected scan environment. The control module 125 then sends the scanned document to the scan server 170. For example, the control module 125 may invoke the SendImage operation (as specified in DSM). The control module 125 may then invoke the EndPostScanJob operation (also as specified in DSM) to end the post-scan job.

The scan server 170 processes the scanned document using the selected scan environment, and may (for example) send the processed scanned document to the other server, computer, or device 180 (not shown). Subsequently, the scan server 170 may generate a PostScanJobStatusEvent event notification (as specified in DSM) at flow 270 to notify the document scanner 110 that the status of the post-scan job has changed. In response, the control module 125 at flow 275 may request the notification module 140 to initiate a notification to the user that the document has been sent to the destination computer. Flows 240 through 255, and 265 through 275 may be repeated for each scanned document that has been stored by the repository module 135 while the network is not available.

Figure 3:
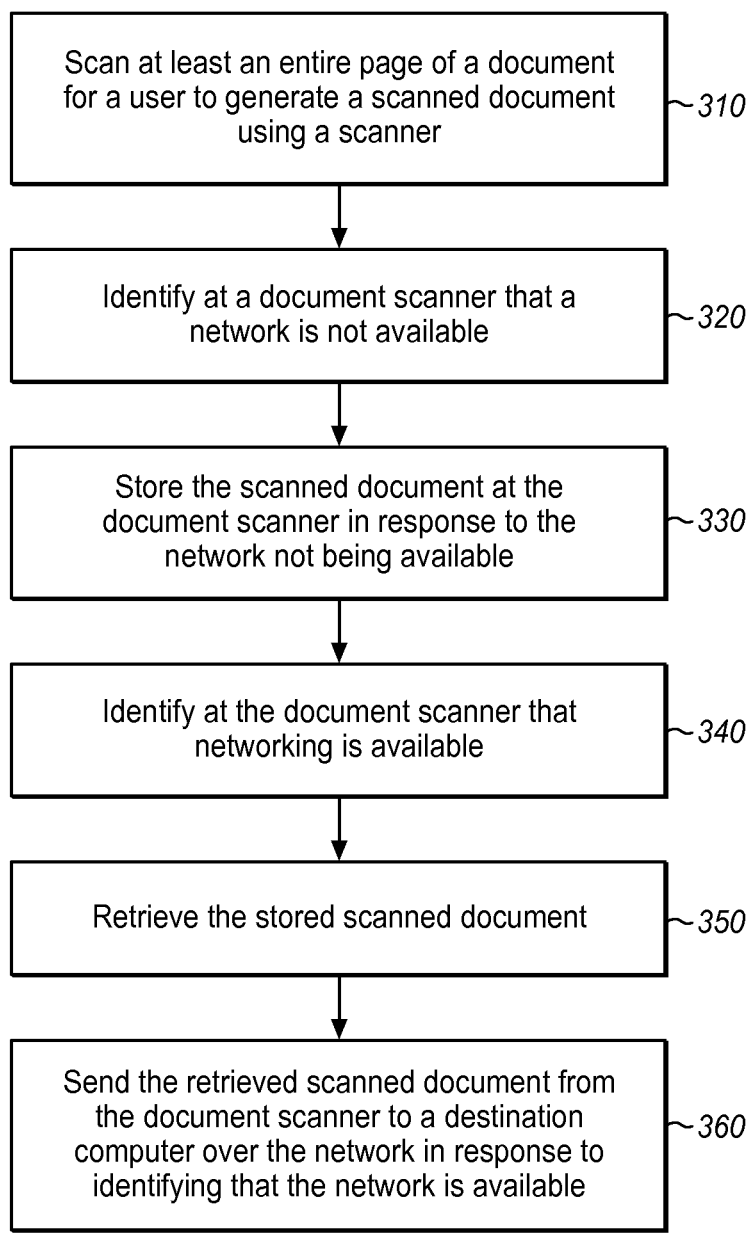
FIG. 3 is a flowchart describing exemplary methods for providing availability for a document scanner in an embodiment.

FIG. 3 is a flowchart describing exemplary methods for providing availability for a document scanner in an embodiment. The method described herein may be operable in, for example, the system of FIG. 1. At step 310, a document scanner scans at least an entire page of a document for a user to generate a scanned document using a scanner. The document may comprise a paper document and may comprise one or more pages. The document scanner may automatically feed through pages of the document and scan each page into an image. An image may correspond with an entire page, or a substantial portion of a page. The scanned document may comprise each scanned image. For example, the scanned document may comprise a PDF file or any other well known image data format.

At step 320, the document scanner identifies that the network is not available. For example, the document scanner may detect that a network cable has been disconnected from the document scanner. The document scanner may also have failed in an attempt to communicate with a scan server and/or a directory server. Indeed, the network is not "available" if the document scanner cannot communicate with a directory server and/or a destination computer.

At step 330, the document scanner stores the scanned document at the document scanner in response to the network not being available. For example, the document scanner may store the scanned document as a file on a storage device. The storage device may comprise a hard drive and/or a solid state device that may be based on flash memory or any other suitable volatile or non-volatile memory.

At step 340, the document scanner identifies that the network is available. While the network is not available, the document scanner may continue to check if the network becomes available again. For example, the document scanner may continue to attempt to establish communication with the destination computer and/or the directory server. The document scanner may also detect if a network cable has been reconnected to the document scanner.

At step 350, the document scanner retrieves the stored scanned document. For example, the document scanner may retrieve the stored scanned document by reading a file from the storage device on which the scanned document is previously stored.

At step 360, the document scanner sends the retrieved scanned document from the document scanner to a destination computer over the network in response to identifying that the network is available. The destination computer may comprise the scan server 170 and/or the other server, computer, or device 180 of FIG. 1. For example, the document may send the scanned document to the scan server for the scan server to process the scanned document and forward the processed scanned document to the other server, computer, or device. In some embodiments, the document scanner may communicate with the other server, computer, or device directly rather than through the scan server.

Figure 4:
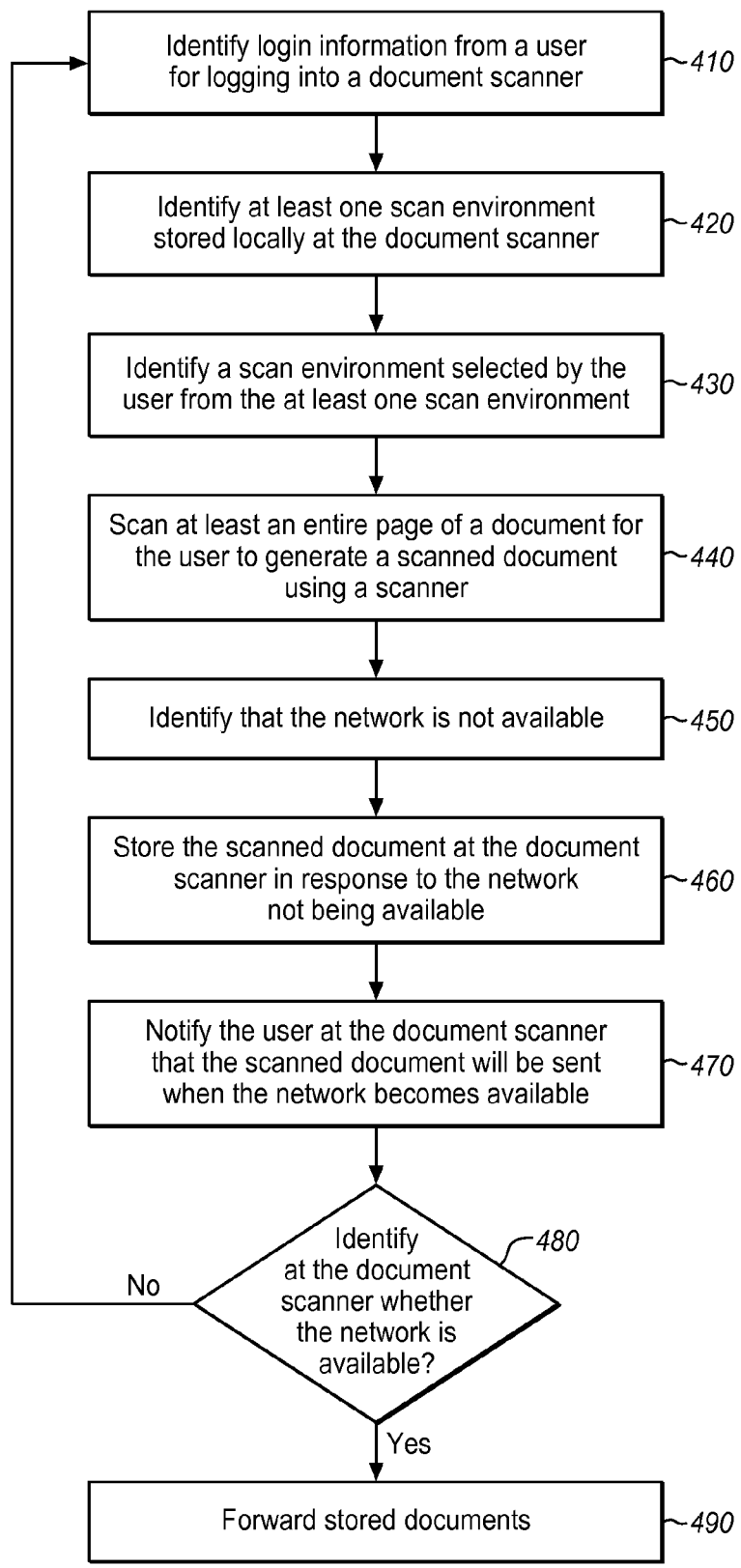
FIGS. 4 and 5 are flowcharts describing exemplary methods for providing availability for a document scanner in an embodiment.
Figure 5:
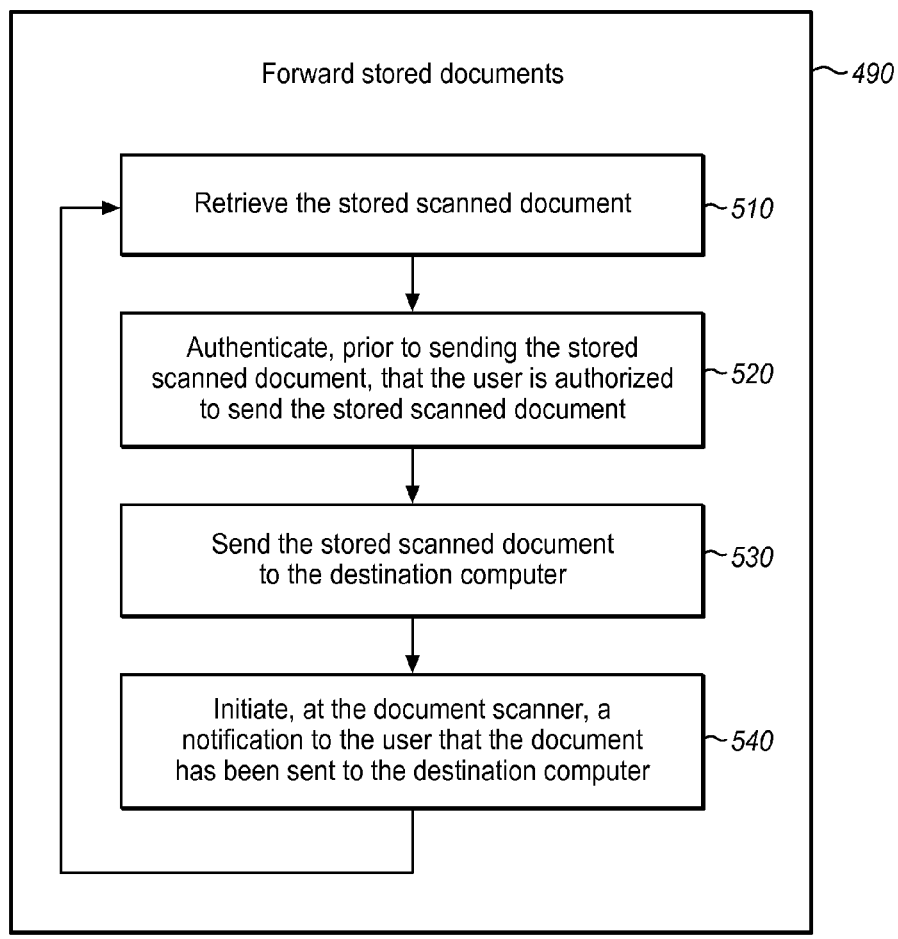

FIGS. 4 and 5 are flowcharts describing exemplary methods for providing availability for a document scanner in an embodiment. The method described herein may be operable in, for example, the system of FIG. 1.

At step 410, the document scanner identifies login information entered by a user for logging into the document scanner. For example, the control module may accept user input of the login information through an operational panel with the user's username and password. In some embodiments, the login information may include a Windows domain name. Alternatively or in addition, the control module may accept the login information based on biometrics or from a card/badge reader with the user's X.509 certificate. Additionally, the control module may accept an input from the user to select a destination computer.

In some embodiments, if the network is available, the control module may contact a server with the login information to log the user into a network domain, thus logging the user into the document scanner with the document scanner being part of the network domain. In certain embodiments, the server may comprise a domain controller, and the network domain may comprise a Windows domain. In another embodiment, after the server has authenticated the login information, the control module may further cache the login information at the document scanner. For example, the control module may contact the repository module to store/cache the login information. The stored login information cached at the document scanner may include the user's username and password, as well as Windows domain name as entered by the user. Alternatively, the stored login information may include the user's biometrics or X.509 certificate, depending on the login information entered by the user.

In embodiments in which the user's login information is stored/cached, if the network becomes unavailable later when the user attempts to login, the control module may match the login information received from user input (i.e., currently entered login information) with one of the stored/cached login information (which was previously entered by the user). For example, the user may enter a username and password, as well as a Windows domain name after the network becomes unavailable, and the control module may retrieve the stored username, password, and Windows domain name (which were previously entered by the user) from the repository module. The control module may then match the entered username, password, and Windows domain name with the stored username, password, and Windows domain name, for example by comparing their respective text strings and/or data structures. If a match is identified, the user is logged into the Windows domain (and the document scanner that is part of the Windows domain) despite the network being unavailable. In yet another embodiment, when the network is not available, the login information is simply captured to be stored with a scanned document. The user is logged into the document scanner without actually authenticating the user. After the network becomes available, the user will then be authenticated as will be discussed in step 520 based on the login information (e.g., as entered by the user and/or stored/cached at the document scanner and/or stored with the scanned document).

At step 420, the control module identifies at least one scan environment stored locally at the document scanner. For example, the control module may contact the repository module for scan environments stored locally at the document scanner. In one embodiment, when the network is previously available, after logging the user into the network domain (and the document scanner), the control module may retrieve from a server a list of scan environments available to the user (based on the user's login information). For example, the server may comprise an Active Directory server (i.e., a domain controller), and the scan environments may comprise PSPs that the user may use. The control module identifies a scan environment selected by the user from the list of scan environments, and retrieves the selected scan environment from the server. The control module may further store the retrieved scan environment at the document scanner (for example, by contacting the repository module), so that a scan environment stored locally comprises the retrieved scan environment. Alternatively or in addition, when the network is available, an administrator may configure a default scan environment (or any number of them) and store the default scan environment at the document scanner. Thus, a scan environment stored locally may comprise the default scan environment.

At step 430, the document scanner identifies a scan environment selected by the user from the at least one scan environment. For example, the document scanner may present a list of scan environments (that are stored locally) on an operational panel, and receive an input from the user selecting one scan environment from the list.

At step 440, the document scanner scans at least an entire page of a document for the user to generate a scanned document using a scanner. For example, the user may push a scan button (or other common user interface), and the control module instructs the scanner to scan the document based on the selected scan environment.

At step 450, the document scanner identifies that the network is not available. For example, the control module may identify the network being unavailable as an internal state based on a failed earlier attempt to communicate with a scan server and/or a directory server, or based on any other suitable means to detect that the network is presently unavailable.

At step 460, the document scanner stores the scanned document at the document scanner in response to the network not being available. For example, the control module may contact the availability module, which in turn contacts the repository module to store the login information, the destination computer, the scanned document, and/or the selected scan environment at the document scanner.

At step 470, the document scanner notifies the user at the document scanner that the scanned document will be sent when the network becomes available. For example, the control module may contact the notification module for the notification module to display a message on the operational panel of the document scanner.

At step 480, the document scanner identifies whether the network is available. For example, the control module may periodically attempt to communicate with a scan server and/ or a directory server. If the control module is able to establish successful communication, the control module may identify that the network has become available. If the network is not available, the document scanner may return to step 410 to scan a next document. If the network is available, the document scanner proceeds to step 490.

At step 490, the document scanner forwards stored documents to a destination computer, the details of which are shown in FIG. 5. At step 510, the document scanner retrieves the stored scanned document. For example, the control module may contact the availability module, which in turn contacts the repository module to retrieve the login information, the destination computer, the scanned document, and the selected scan environment.

At step 520, the document scanner authenticates, prior to sending the stored scanned document, that the user is authorized to send the stored scanned document. The user's login information may have been stored in the repository module, and the availability module retrieves the login information from the repository module. The control module may or may not have matched the login information with the cached login information discussed in step 410. However, even if the login information has been matched with the cached login information, the user may no longer be authorized to use the document scanner and/or send the scanned document to a destination computer. Thus, the availability module may contact the security module for the security module to authenticate the user with a server using the login information. For example, the security module may identify that the user is still authorized to login into the network domain (with the document scanner being part of the network domain).

Additionally, the user may have selected a scan environment that has been stored locally at the document scanner. The security module may retrieve a list of scan environments available to the user from a server, so that the security module can identify that the selected scan environment matches one of the list of scan environments. Similarly, the security module may further identify whether the user is authorized to send the scanned document to the destination computer in some embodiments. However, in other embodiments, if the login information is authenticated and/or the selected scan environment matches one of the list of available scan environments, the user is assumed to be authorized to send the scanned document to the destination computer.

At step 530, the document scanner sends the stored scanned document to the destination computer. For example, the availability module may return the login information, the destination computer, the scanned document, and the selected scan environment to the control module. The control module may thus contact the destination computer with the user's credentials (based on the login information) to send the scanned document and selected scan environment to the destination computer. In some embodiments, the destination computer may comprise the scan server, and after the scan server processes the scanned document using the selected scan environment, the document scanner may receive an event notification from the scan server. For example, as part of processing the scanned document, the scan server may forward the scanned document to the other server, computer, or device. Alternatively or in addition, the scan server may perform other processing as determined by the selected scan environment. The scan server then generates the notification after having sent the scanned document to the other server, computer, or device.

At step 540, the document scanner initiates a notification to the user that the document has been sent to the destination computer. For example, the control module may request the notification module to initiate a notification to the user that the document has been successfully sent to the destination computer or not. For example, the user may receive an e-mail, text message, and/or voice message as a result. The particular type of notification for each user may be configured by an administrator and/or may be selected by each user. Subsequently, the stored scanned document may be deleted automatically. Steps 510 through 540 may be repeated for each scanned document that has been stored at the document scanner while the network is not available.

Figure 6:
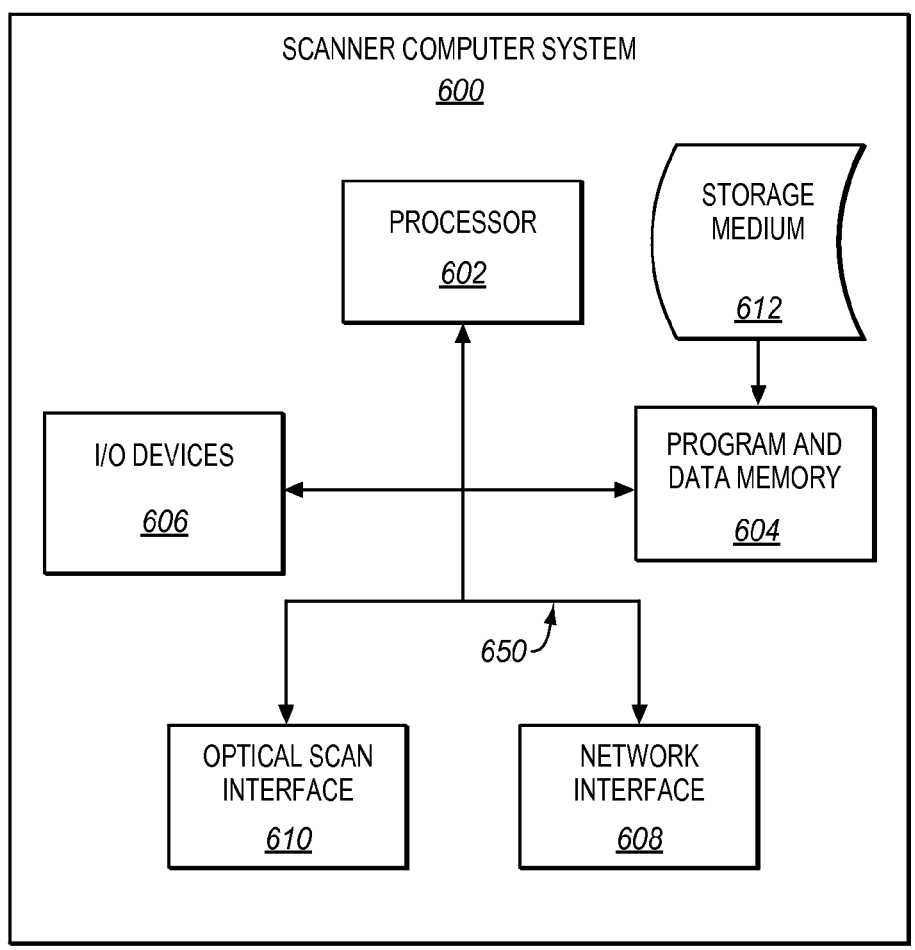
FIG. 6 is a block diagram of an exemplary computer system for providing availability for a document scanner in an embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram of an exemplary scanner computer system 600 adapted to provide availability for a document scanner in an embodiment. For example, the control module 125, availability module 130, repository module 135, notification module 140, and security module 145 of FIG. 1 may all operate at/by the scanner computer system 600. The document scanner 110 may include the scanner computer system 600.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A scanner computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code in order to reduce the number of times code must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the scanner computer system 600 to be coupled with other data processing systems or storage devices through intervening private or public networks. Modems, cable modems, IBM Channel attachments, SCSI, Fibre Channel, and Ethernet cards are just a few of the currently available types of network or host interface adapters. Optical scan interface 610 may be coupled to the system to interface to one or more scan device such as a scanner.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc.

Although specific embodiments were described herein, the scope of the invention is not limited to those specific embodiments. The scope of the invention is defined by the following claims and any equivalents thereof.

I claim:

1. A method to provide availability for a document scanner on a network, the method comprising:
retrieving, from a server while the network is available, a list of scan environments available to a user;
identifying a scan environment selected by the user from the list of scan environments;
retrieving the selected scan environment from the server; and
storing the retrieved scan environment at the document scanner, wherein the at least one scan environment stored locally at the document scanner comprises the retrieved scan environment;
scanning at least an entire page of a document for the user to generate a scanned document using the document scanner;
identifying at the document scanner that the network is not available;
storing the scanned document at the document scanner in response to the network not being available;
identifying the scan environment stored locally at the document scanner that indicates how the scanned document was processed by the document scanner, the scan environment including a list of scan settings that were used by the document scanner to generate the stored scanned document and also including information describing a destination computer;
identifying at the document scanner that the network is available;
retrieving the stored scanned document and the scan environment; and
sending the retrieved scanned document and the retrieved scan environment from the document scanner to the destination computer over the network in response to identifying that the network is available.

2. The method of claim 1, further comprising:
storing a default scan environment at the document scanner, wherein the default scan environment is configured when the network is available, and wherein the scan environment selected by the user comprises the default scan environment;
retrieving, from the server after the network becomes available, the list of scan environments available to the user; and
identifying that the scan environment selected by the user matches one of the list of scan environments available to the user.

3. The method of claim 1, further comprising:
identifying login information from the user for logging into the document scanner; and
authenticating with the server based the login information, prior to sending the stored scanned document, that the user is authorized to send the stored scanned document to the destination computer.

4. The method of claim 1, further comprising:
identifying login information entered by the user for logging into the document scanner, wherein the entered login information matches stored login information cached at the document scanner, and wherein the stored login information is cached at the document scanner after the document scanner has authenticated with the server that the user is authorized to send scanned documents to the destination computer; and
authenticating with the server based on the login information, prior to sending the stored scanned document, that the user is still authorized to send the stored scanned document to the destination computer.

5. The method of claim 1, wherein storing the scanned document further comprises storing an identification of the user, the method further comprising:
scanning another document for another user when the network is not available;
storing the other scanned document; and
sending, from the document scanner to the destination computer over the network, the other stored scanned document for the other user also in response to identifying that the network is available.

6. A method to provide availability for a document scanner on a network, the method comprising:
- retrieving, from an Active Directory server while the network is available, a list of PSPs available to a user;
- identifying a PSP selected by the user from the list of PSPs;
- retrieving the selected PSP from the Active Directory server; and
- storing the retrieved PSP at the document scanner, wherein the at least one PSP stored locally at the document scanner comprises the retrieved PSP;
- scanning at least an entire page of a document for the user to generate a scanned document using the document scanner;
- identifying at the document scanner that the network is not available;
- storing the scanned document at the document scanner in response to the network not being available;
- identifying a scan environment stored locally at the document scanner that indicates how the scanned document was processed by the document scanner, the scan environment including a list of scan settings that were used by the document scanner to generate the stored scanned document and also including information describing a destination computer;
- identifying at the document scanner that the network is available;
- retrieving the stored scanned document and the scan environment; and
- sending the retrieved scanned document, the retrieved scan environment, and the selected PSP from the document scanner to a Distributed Scan Management ("DSM") server over the network in response to identifying that the network is available;
- wherein the document scanner comprises a DSM device.

7. The method of claim 6, further comprising:
- storing a default PSP at the document scanner, wherein the default PSP is configured when the network is available, and wherein the PSP selected by the user comprises the default PSP;
- retrieving, from the Active Directory server after the network becomes available, the list of PSPs available to the user; and
- identifying that the PSP selected by the user matches one of the list of PSPs available to the user.

8. The method of claim 6, further comprising:
- identifying login information from the user for logging into the document scanner; and
- authenticating with the Active Directory server based the login information, prior to sending the stored scanned document, that the user is authorized to send the stored scanned document to the destination computer.

9. The method of claim 6, further comprising:
- identifying login information entered by the user for logging into the document scanner, wherein the entered login information matches stored login information cached at the document scanner, and wherein the stored login information is cached at the document scanner after the document scanner has authenticated with the Active Directory server that the user is authorized to send scanned documents to the destination computer; and
- authenticating with the Active Directory server based the login information, prior to sending the stored scanned document, that the user is still authorized to send the stored scanned document to the destination computer.

10. A document scanner for scanning documents over a network, the document scanner comprising:
- a control module operable to retrieve, from a server while the network is available, a list of scan environments available to a user;
- the control module is further operable to identify a scan environment selected by the user from the list of scan environments;
- the control module is further operable to retrieve the selected scan environment from the server; and
- a repository module is operable to store the retrieved scan environment at the document scanner, wherein the at least one scan environment stored locally at the document scanner comprises the retrieved scan environment; wherein
- the scanner is operable to scan at least an entire page of a document for the user to generate a scanned document;
- the control module operable to identify whether the network is available;
- the repository module is further operable to store the scanned document at the document scanner in response to the network not being available and further operable to identify the scan environment stored locally at the document scanner that indicates how the scanned document was processed by the document scanner, the scan environment including a list of scan settings that were used by the document scanner to generate the stored scanned document and also including information describing a destination computer;
- the scanner further comprising: an availability module operable to retrieve the stored scanned document and the scan environment, wherein the control module is further operable to send the retrieved scanned document from the document scanner to the destination computer over the network in response to the control module identifying that the network is available.

11. The document scanner of claim 10, wherein:
- the control module is further operable to identify, when the network is not available, at least one scan environment stored locally at the document scanner;
- the control module is further operable to identify the scan environment selected by the user from the at least one scan environment;
- the repository module is further operable to store the selected scan environment, and wherein the control module is further operable to send the selected scan environment.

12. The document scanner of claim 11, wherein:
- the repository module is further operable to store a default scan environment at the document scanner, wherein the default scan environment is configured when the network is available, and wherein the scan environment selected by the user comprises the default scan environment;
- the control module is further operable to retrieve, from the server after the network becomes available, a list of scan environments available to the user; and
- the control module is further operable to identify that the scan environment selected by the user matches one of the list of scan environments available to the user.

13. The document scanner of claim 10, wherein the control module is further operable to identify login information from the user for logging into the document scanner; and
- the document scanner further comprises a security module operable to authenticate with the server based the login information, prior to sending the stored scanned document, that the user is authorized to send the stored scanned document to the destination computer.

14. The document scanner of claim 10, wherein:

wherein the control module is further operable to identify login information entered by the user for logging into the document scanner, wherein the entered login information matches stored login information cached at the document scanner, and wherein the stored login information is cached at the document scanner after the document scanner has authenticated with the server that the user is authorized to send the scanned documents to the destination computer; and the document scanner further comprises a security module operable to authenticate with the server based the login information, prior to sending the stored scanned document, that the user is still authorized to send the stored scanned document to the destination computer.

15. The document scanner of claim 10, wherein:

the repository module is further operable to store an identification of the user, the method further comprising:

the scanner is further operable to scan another document for another user when the network is not available;

the repository module is further operable to store the other scanned document; and the control module is further operable to send, from the document scanner to the destination computer over the network, the other stored scanned document for the other user also in response to the control module identifying that the network is available.

* * * * *